(12) United States Patent
An

(10) Patent No.: US 10,951,083 B2
(45) Date of Patent: Mar. 16, 2021

(54) STATOR UNIT, STATOR, AND MOTOR COMPRISING SAME

(71) Applicant: LG INNOTEK CO., LTD., Seoul (KR)

(72) Inventor: Il Hwan An, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 8 days.

(21) Appl. No.: 16/307,844

(22) PCT Filed: Jun. 26, 2017

(86) PCT No.: PCT/KR2017/006704
§ 371 (c)(1),
(2) Date: Dec. 6, 2018

(87) PCT Pub. No.: WO2018/008880
PCT Pub. Date: Jan. 11, 2018

(65) Prior Publication Data
US 2019/0296597 A1    Sep. 26, 2019

(30) Foreign Application Priority Data
Jul. 7, 2016 (KR) .................. 10-2016-0086216

(51) Int. Cl.
*H02K 1/14* (2006.01)
*H02K 3/32* (2006.01)
(Continued)

(52) U.S. Cl.
CPC .............. *H02K 3/325* (2013.01); *H02K 1/14* (2013.01); *H02K 1/148* (2013.01); *H02K 3/34* (2013.01);
(Continued)

(58) Field of Classification Search
CPC .......... H02K 3/325; H02K 5/22; H02K 3/52; H02K 1/14; H02K 3/34; H02K 1/148;
(Continued)

(56) References Cited

U.S. PATENT DOCUMENTS 5,986,377 A    11/1999 Yamada et al.
6,664,703 B2 * 12/2003 Oketani ............... H02K 3/345
                                                              29/596

(Continued)

FOREIGN PATENT DOCUMENTS

CN        1196598 A    10/1998
CN        1967970 A     5/2007
(Continued)

*Primary Examiner* — John K Kim
(74) *Attorney, Agent, or Firm* — Birch, Stewart, Kolasch & Birch, LLP

(57) ABSTRACT

Embodiments relate to a stator unit, a stator, and a motor comprising same, the stator unit comprising: a unit stator core; an insulator disposed on the unit stator core; and a coil wound on the insulator, wherein the unit stator core comprises a main body formed so as to have a prescribed curvature with reference to the centre, and three teeth formed so as to protrude toward the centre from the main body, the main body comprising notches formed between the teeth. Thus mass productivity can be increased as a result of series winding using a coil on a unit stator core having three teeth arranged thereon.

20 Claims, 10 Drawing Sheets

(51) Int. Cl.
  *H02K 3/52* (2006.01)
  *H02K 5/22* (2006.01)
  *H02K 3/34* (2006.01)

(52) U.S. Cl.
  CPC ............ *H02K 3/52* (2013.01); *H02K 3/522* (2013.01); *H02K 5/22* (2013.01); *H02K 2203/09* (2013.01)

(58) Field of Classification Search
  CPC ............ H02K 3/522; H02K 2203/09; H02K 2203/12; H02K 3/28
  USPC ............................................ 310/71, 216.008
  See application file for complete search history.

(56) References Cited

U.S. PATENT DOCUMENTS

| | | | | |
|---|---|---|---|---|
| 8,334,631 | B2* | 12/2012 | Tsumagari | H02K 1/12 310/216.016 |
| 8,569,924 | B2* | 10/2013 | Yasuda | H02K 1/185 310/216.069 |
| 8,878,407 | B2 | 11/2014 | Ikura | |
| 9,001,459 | B2* | 4/2015 | Abe | G11B 19/2009 360/99.08 |
| 2002/0130582 | A1* | 9/2002 | Oketani | H02K 3/345 310/216.004 |
| 2007/0046129 | A1* | 3/2007 | Suginobu | G11B 19/2009 310/216.016 |
| 2007/0096587 | A1 | 5/2007 | Ionel et al. | |
| 2009/0085415 | A1* | 4/2009 | Ionel | H02K 1/148 310/43 |
| 2009/0256439 | A1* | 10/2009 | Inoue | H02K 3/522 310/71 |
| 2012/0286593 | A1 | 11/2012 | Yokogawa et al. | |
| 2013/0099604 | A1 | 4/2013 | Yu | |
| 2016/0190888 | A1 | 6/2016 | Kim | |
| 2018/0026487 | A1* | 1/2018 | Koga | H02K 3/28 310/156.01 |
| 2019/0296597 | A1* | 9/2019 | An | H02K 3/34 |

FOREIGN PATENT DOCUMENTS

| | | |
|---|---|---|
| CN | 105743258 A | 7/2016 |
| JP | 2004-274970 A | 9/2004 |
| KR | 10-2013-0043343 A | 4/2013 |
| KR | 10-2015-0142767 A | 12/2015 |
| KR | 10-2016-0067338 A | 6/2016 |

\* cited by examiner

[Figure 1]
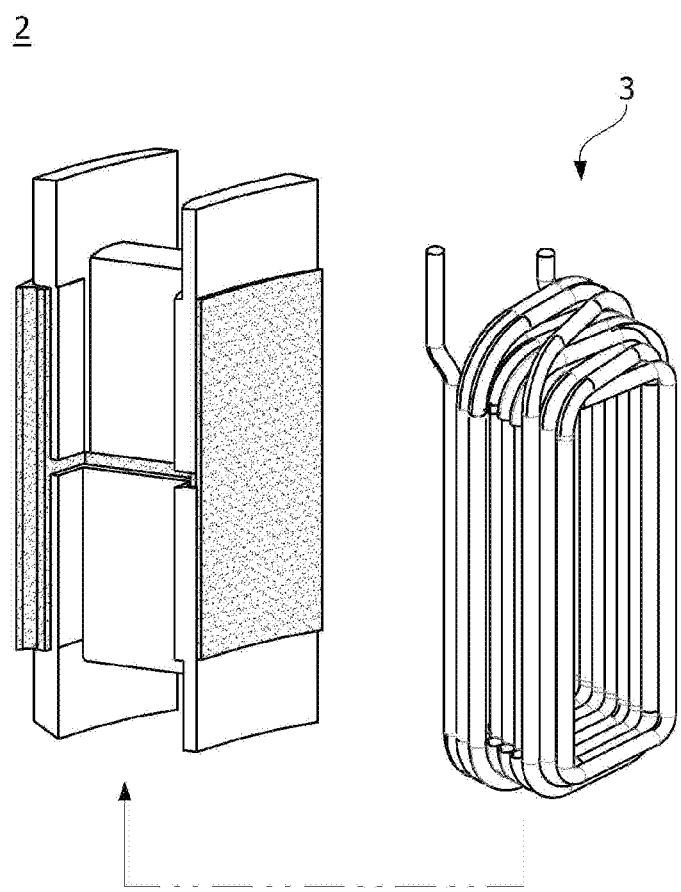

【Figure 2】
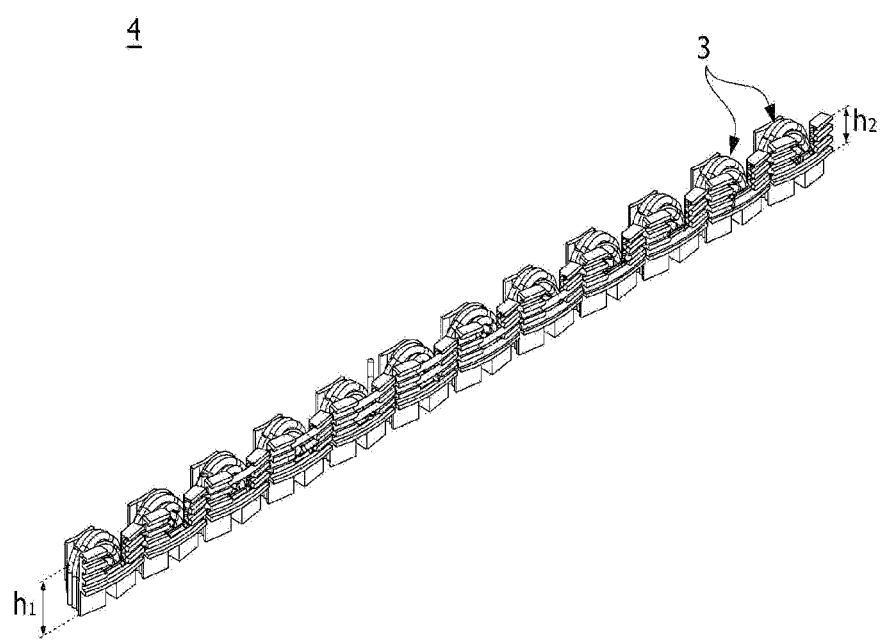

【Figure 3】
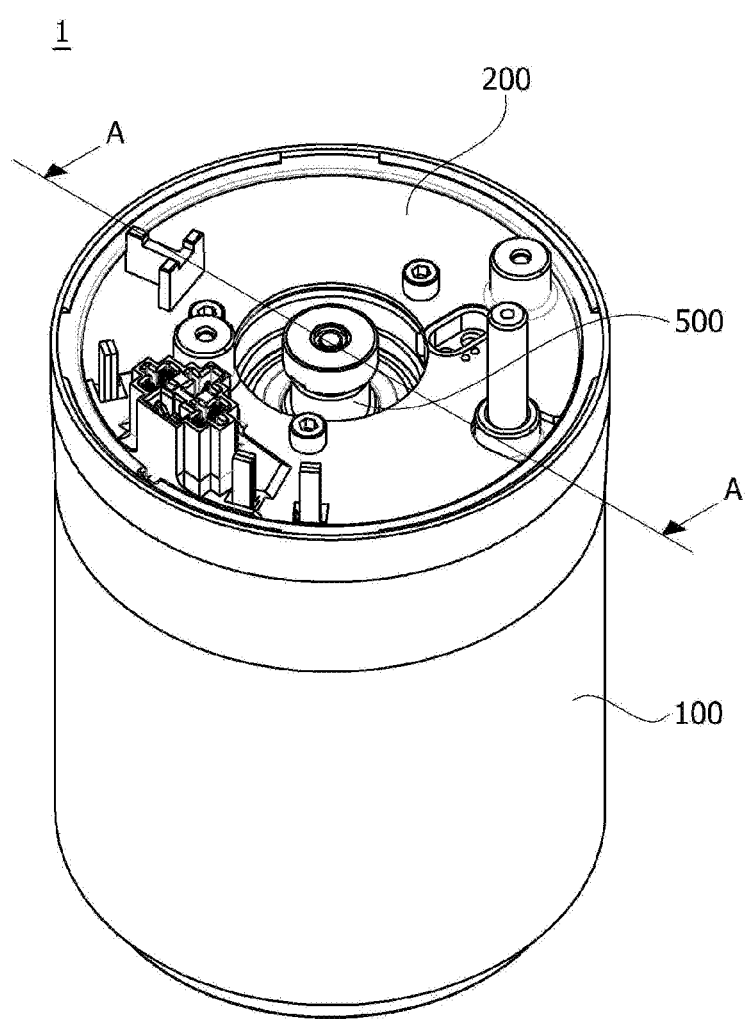

[Figure 4]
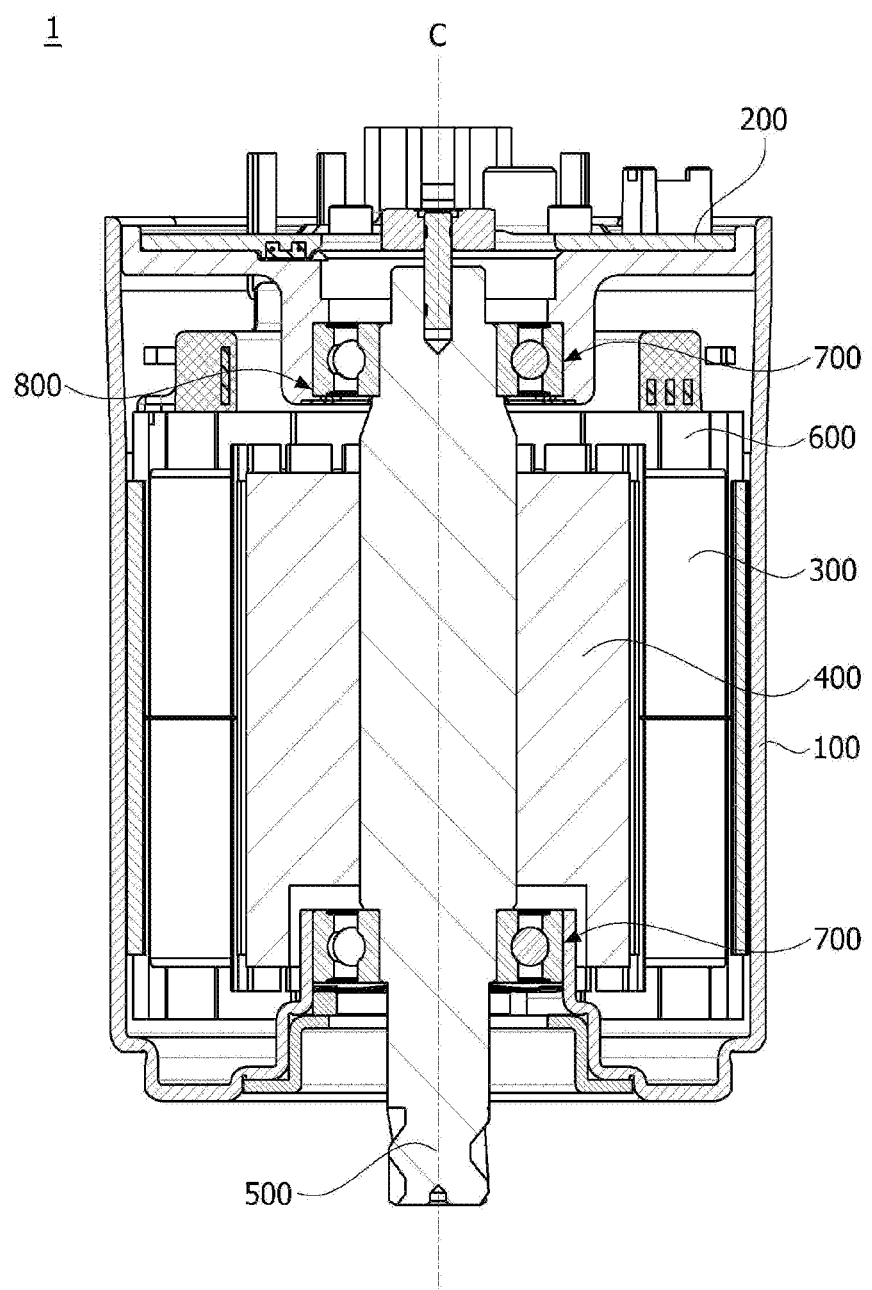

【Figure 5】
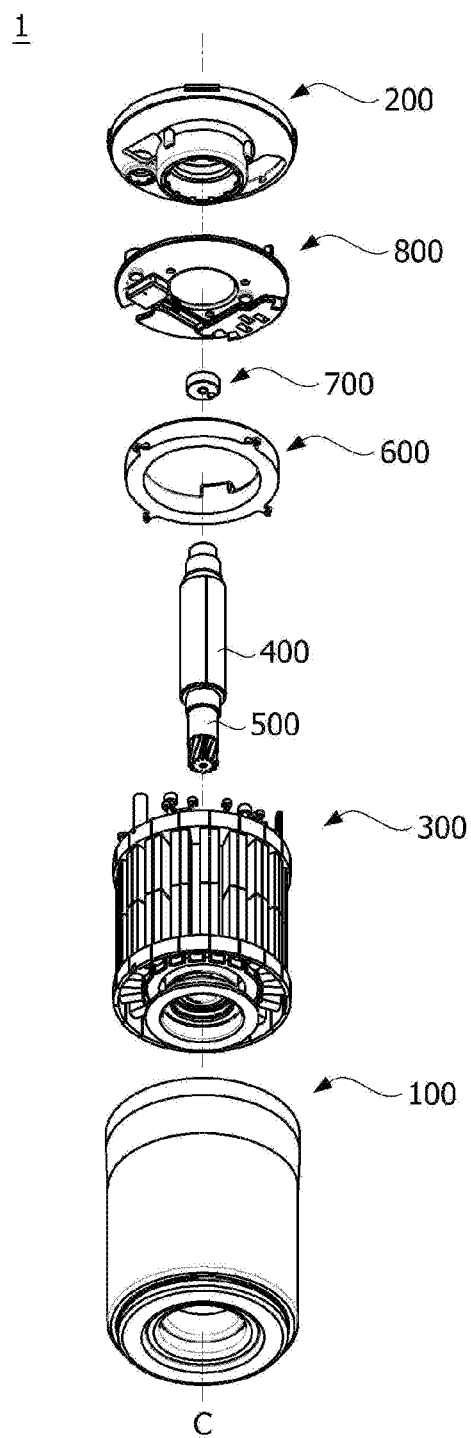

[Figure 6]
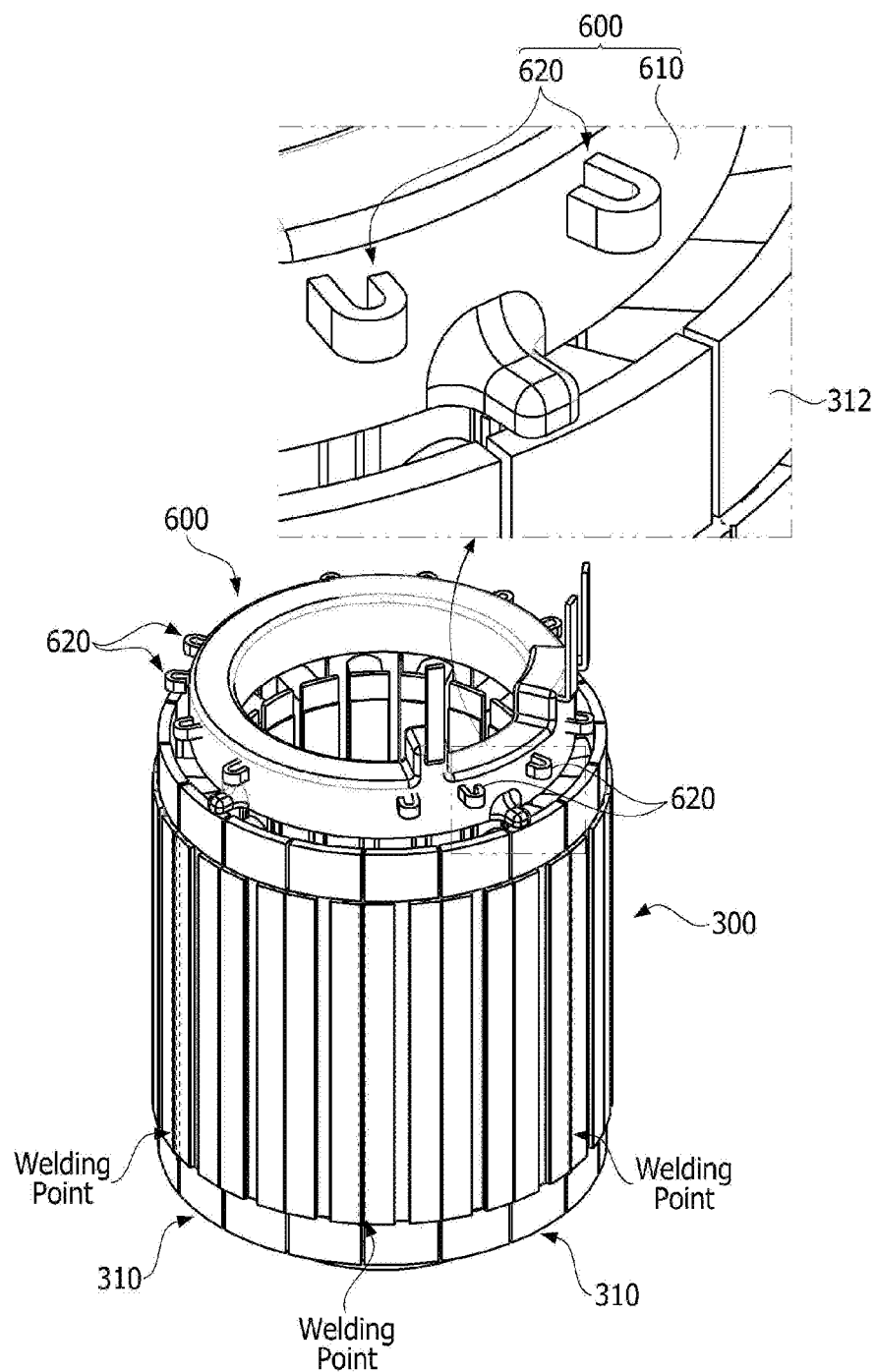

[Figure 7]
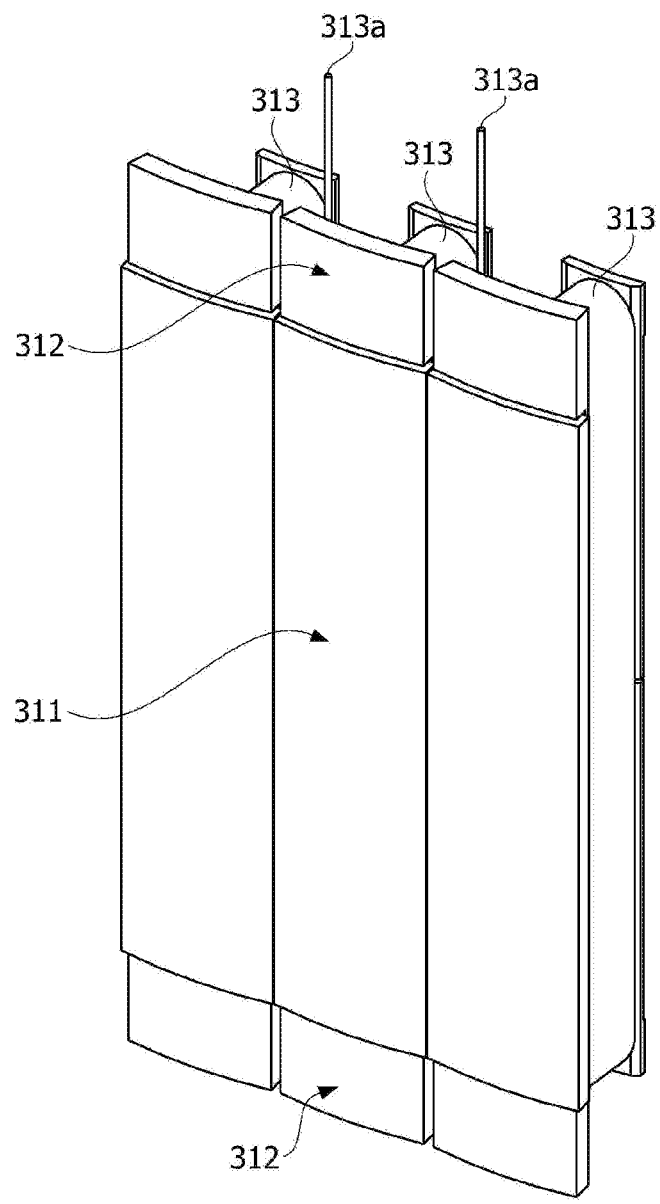

【Figure 8】
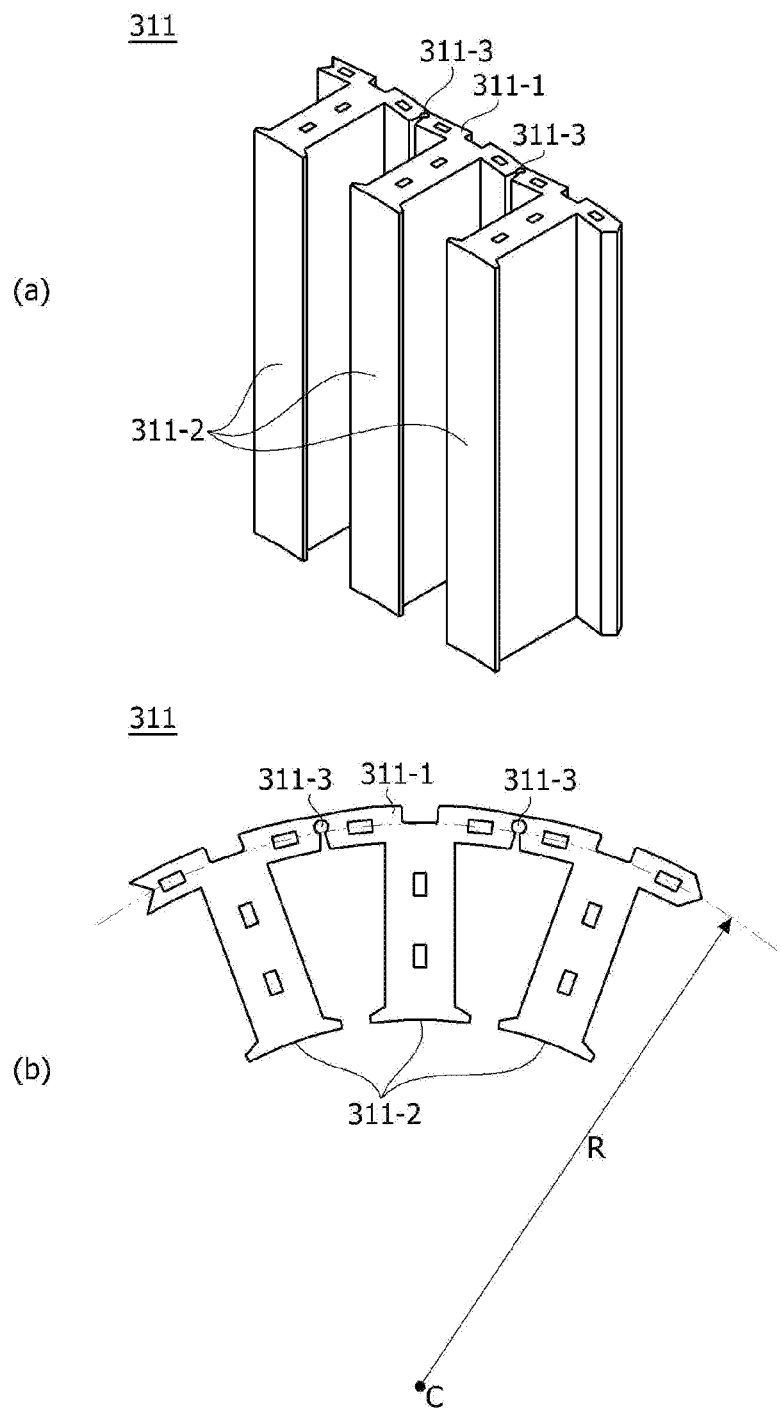

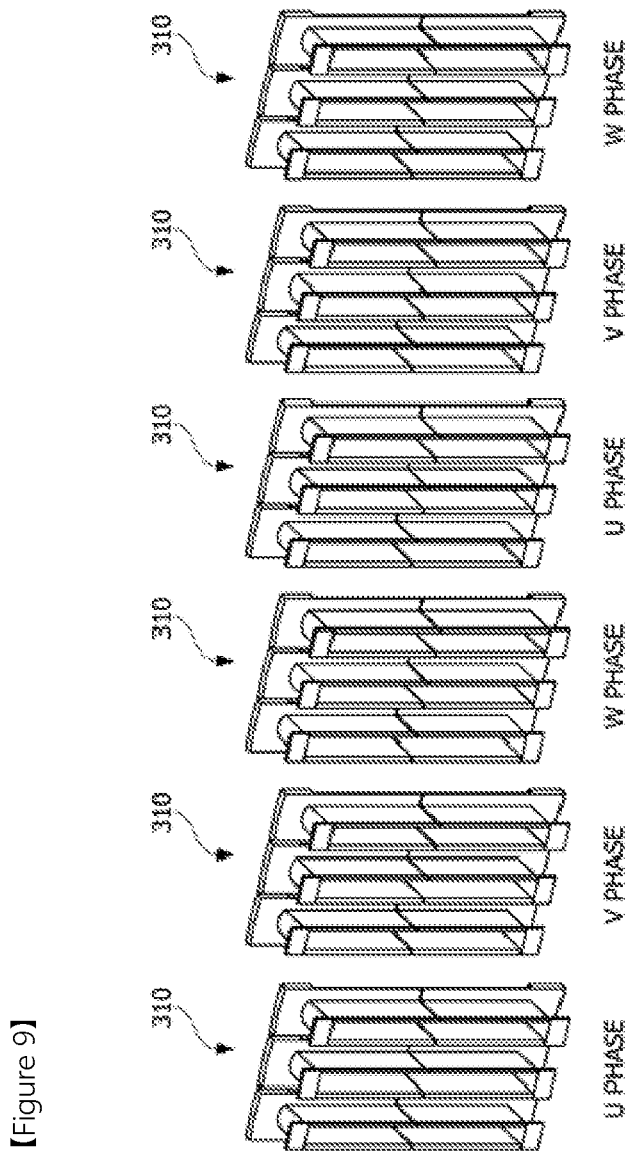
[Figure 9]

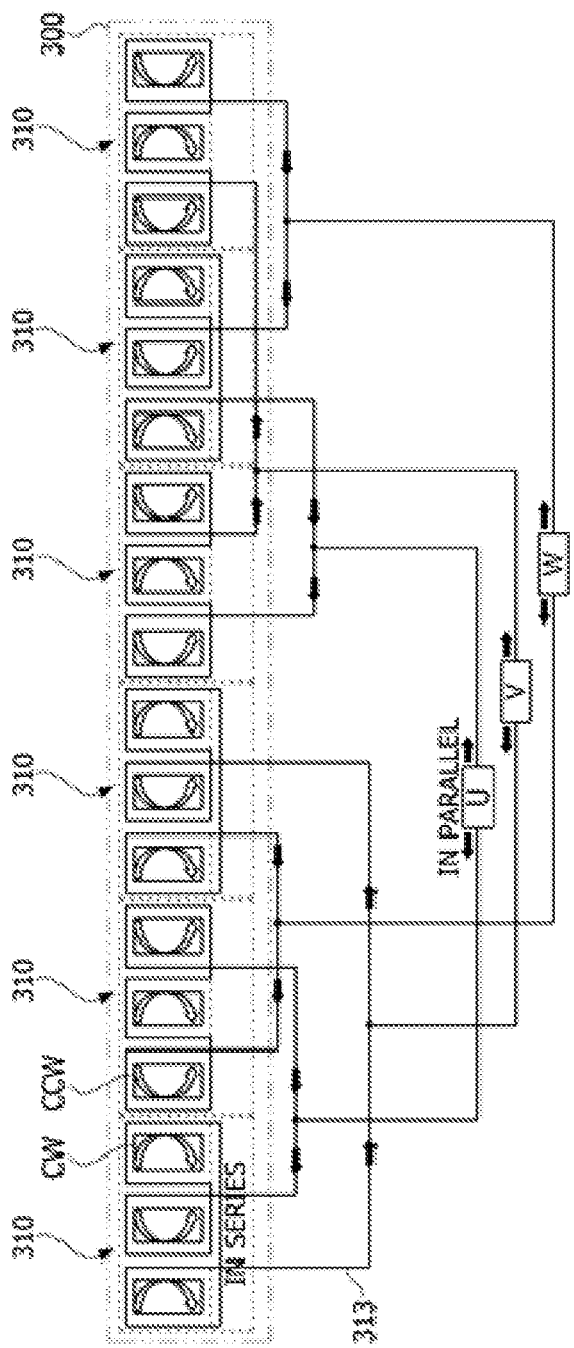
[Figure 10]

STATOR UNIT, STATOR, AND MOTOR COMPRISING SAME

Cross Reference to Related Applications

This application is the National Phase of PCT International Application No. PCT/KR2017/006704, filed on Jun. 26, 2017, which claims priority under 35 U.S.C. 119(a) to Patent Application No. 10-2016-0086216, filed in the Republic of Korea on Jul. 7, 2016, all of which are hereby expressly incorporated by reference into the present application.

TECHNICAL FIELD

The present invention relates to a stator unit, a stator, and a motor including the same.

BACKGROUND ART

A motor is an apparatus configured to convert electrical energy to rotation energy using a force that a conductor receives in a magnetic field. Recently, since purposes of a motor are increasing, a function of the motor has become important. Particularly, since electrification of a vehicle is rapidly proceeding, demands for a motor applied to a steering system, a braking system, a designing system, and the like are significantly increasing.

Generally, the motor is provided with a rotary shaft which is rotatably formed, a rotor coupled to the rotary shaft, and a stator fixed to the inside of a housing, and the stator is installed along an edge of the rotor with a gap. Further, a coil configured to form a rotating magnetic field is wound around the stator and causes electrical interaction with the rotor to induce rotation of the rotor. As the rotor rotates, the rotary shaft rotates and generates a driving force.

Further, a bus bar electrically connected to the coil is disposed on an upper end of the stator. The bus bar includes a roughly ring-shaped bus bar housing, and a bus bar terminal coupled to the bus bar housing and to which the coil is connected. Usually, in the bus bar, the bus bar terminal is formed by pressing a metal plate such as a copper plate.

In this case, a plurality of terminals directly connected to the coil can be provided on the bus bar terminal, and each of the terminals can be processed with one area snapped due to an area limitation or a location of a connection terminal of the coil.

Further, the rotary shaft can be rotatably supported in the housing by a bearing. In this case, the bearing can be disposed to be supported in the housing or press-fitted into the bus bar housing to be installed.

Meanwhile, the stator can be formed of one unfolding core or a plurality of split cores coupled to each other.

Particularly, when a plurality of split cores 2 shown in FIG. 1 are connected to implement a stator, each of the cores can be separated. Accordingly, when a coil 3 is wound, since a serial circuit is difficult to be implemented in equipment, mass productivity decreases.

Further, when a bus bar is used to implement the serial circuit, core stack decreases and the performance is degraded.

Meanwhile, in a case of an unfolding core 4 shown in FIG. 2, since three nozzle winding cannot be implemented due to a characteristic of the unfolding core, investment cost increases.

Further, when both ends of the unfolding core 4 are connected to form a stator, since a height difference (h1−h2) between both ends in molding occurs, assemblability is reduced and the performance thereof is degraded.

DISCLOSURE

Technical Problem

The present invention is directed to providing a stator unit, a stator, and a motor including the same, configured to wind a coil around a unit stator core, on which three teeth are provided, to implement serial winding, thereby improving mass productivity.

Problems desired to be solved by the present invention are not limited to the above-described problems, and other problems not mentioned above may be apparently understood by those skilled in the art from below.

Technical Solution

One aspect of the present invention provides a stator unit including a unit stator core, an insulator disposed on the unit stator core, and a coil wound around the insulator, wherein the unit stator core includes a main body formed to have a predetermined curvature on the basis of a center and three teeth formed to protrude from the main body toward the center, wherein the main body includes notches formed between the teeth.

A cross-section of the tooth which is perpendicular to the center may be formed in a T shape.

A winding direction of the coil wound around a center tooth of the three teeth may be opposite to winding directions of the coils wound around teeth disposed at both sides.

Further, two end portions of the coil may be disposed on the unit stator core.

Another aspect of the present invention provides a stator formed by a plurality of stator units disposed along a circumferential direction, and each of the stator units includes a unit stator core, an insulator disposed on the unit stator core, and a coil wound around the insulator, wherein the unit stator core includes a main body formed to have a predetermined curvature on the basis of a center and three teeth formed to protrude from the main body toward the center, and the main body includes notches formed between the teeth.

Six stator units may be disposed along the circumferential direction, and the unit stator cores of the stator units may have side surfaces attached to each other by welding.

Further, two stator units of the stator units may implement at least one of a U phase, a V phase, and a W phase.

In addition, two end portions of the coil disposed on each of the stator units may be disposed on the unit stator core.

Meanwhile, a winding direction of the coil wound around a center tooth of the three teeth may be opposite to winding directions of the coils wound around teeth disposed at both sides.

The coil wound around the center tooth of the three teeth may be wound in a counterclockwise direction, and the coils wound around the teeth disposed at both sides may be wound in a clockwise direction.

The two stator units configured to implement the same phase may be disposed at locations symmetrical to each other on the basis of the center.

Still another aspect of the present invention provides a motor including a rotary shaft, a rotor having the rotary shaft disposed at a center thereof, a stator disposed at the outside of the rotor; a housing configured to accommodate the rotor and the stator, and a bus bar disposed on the stator, wherein the stator is formed by disposing a plurality of stator units along a circumferential direction, the stator unit includes a unit stator core, an insulator disposed on the unit stator core, and a coil wound around the insulator and having an end portion connected to the bus bar, the unit stator core includes a main body formed to have a predetermined curvature on the basis of a center and three teeth formed to protrude from the main body toward the center, and the main body includes notches formed between the teeth.

Further, six stator units may be disposed along the circumferential direction to form the stator, and the unit stator cores of the stator units may have side surfaces attached to each other by welding.

In addition, two stator units of the stator units may implement at least one of a U phase, a V phase, and a W phase.

In addition, two end portions of the coil disposed on each of the stator units may be disposed on the unit stator core.

In addition, the end portions of the coil may be fused with a bus bar terminal of the bus bar.

Meanwhile, a winding direction of the coil wound around a center tooth of the three teeth may be opposite to winding directions of the coils wound around teeth disposed at both sides.

Advantageous Effects

A stator unit, a stator, and a motor including the same according to an embodiment having the above-described configuration can implement serial winding using a coil around a unit stator core, on which three teeth are provided, thereby improving mass productivity.

Further, since a serial circuit is implemented by winding, performance degradation according to stack reduction can be prevented. Accordingly, a size of a bus bar can be minimized.

In addition, when the coil is wound around each unit stator core on which three teeth are provided, individual winding according to application of the unit stator core can be applied. Accordingly, since minimization of a winding time and maintenance of a winding apparatus are easy, investment cost can be minimized.

In addition, since the unit stator core on which three teeth are provided is used, a horizontal tolerance between unit stator cores is minimized and an evenness degree can be managed. Accordingly, performance degradation and a cause of a noise and vibration occurrence can be minimized. Accordingly, reliability of the motor can be improved.

DESCRIPTION OF DRAWINGS

FIG. 1 is a view illustrating one split core.

FIG. 2 is a view illustrating an unfolding core.

FIG. 3 is a perspective view illustrating a motor according to an embodiment.

FIG. 4 is a cross-sectional view taken along line A-A in FIG. 3.

FIG. 5 is an exploded perspective view illustrating the motor according to the embodiment.

FIG. 6 is a view illustrating a stator and a bus bar of the motor according to the embodiment.

FIG. 7 is a view illustrating a stator unit according to the embodiment.

FIG. 8 is a view illustrating a unit stator core of the stator unit according to the embodiment.

FIG. 9 is a view illustrating six stator units according to the embodiment showing a U phase, a V phase, and a W phase.

FIG. 10 is a view illustrating winding relation of a coil with respect to the six stator units according to the embodiment.

MODES OF THE INVENTION

Since the present invention may be variously changed and have various embodiments, particular embodiments will be exemplified in the drawings and described. However, the present invention is not limited to the particular embodiment and includes all changes, equivalents, and substitutes falling within the spirit and the scope of the present invention.

Further, it should be understood that, although the terms "first," "second," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

When predetermined components are mentioned to be "linked," "coupled," or "connected" to other components, the components may be directly linked or connected to other components, but it should be understood that additional components may be "linked," "coupled," or "connected" therebetween. However, when the predetermined components are mentioned to be "linked," "coupled," or "connected" to other components, it should be understood that no additional components exist between the above-described components.

In the description of the embodiments, a term "on" or "under" in a case in which one predetermined component is disclosed to be formed "on" or "under" another component includes both a case in which the two components are in direct contact with each other and a case in which at least still another component is formed to be disposed between the two components. Further, the term "on" or "under" may also include terms "upward direction" and "downward direction" with respect to one component.

Terms used in the present invention are just used to describe the particular embodiments, and not to limit the present invention. The singular form is intended to also include the plural form, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Unless otherwise defined, all terms including technical or scientific terms used in the present invention have meanings the same as those of terms generally understood by those skilled in the art. Generally used terms defined in a dictionary should be interpreted to have meanings the same as meanings in the context of the related art and are not interpreted as ideal or excessively formal meanings unless the present invention clearly defines otherwise.

Hereinafter, embodiments will be described in detail with reference to the accompanying drawings, and the same reference numerals are applied to the same or corresponding components regardless of the drawing numerals, and overlapping descriptions will be omitted.

FIG. 3 is a perspective view illustrating a motor according to an embodiment, FIG. 4 is a cross-sectional view taken along line A-A in FIG. 3, and FIG. 5 is an exploded perspective view illustrating the motor according to the embodiment.

Referring to FIGS. 3 to 5, a motor 1 according to an embodiment of the present invention may include a housing 100 in which an accommodation space is formed, a cover 200, a stator 300, a rotor 400, a rotary shaft 500 configured to rotate with the rotor 400, a bus bar 600, and bearings 700.

Here, the bearings 700 may allow the rotary shaft 500 to rotate and may be disposed at an upper portion and a lower portion of the rotary shaft 500.

The housing 100 may form an exterior of the motor 1 and determine a size of the motor 1. Further, the housing 100 may have an accommodation space formed therein and may have an opening formed at one side thereof.

In the accommodation space, as shown in FIG. 4, the stator 300, the rotor 400, the rotary shaft 500, and the like may be disposed.

The cover 200 may be disposed to cover the opening.

Further, the cover 200 may be fixed to the opening of the housing 100 by an adhesion member (not shown). Here, epoxy, silicon, urethane, synthetic rubber, an acrylonitrile butadiene styrene (ABS) material, or the like may be used as the adhesion member.

That is, the adhesion member may be applied on an inner circumferential surface of the opening of the housing 100, and the cover 200 may be disposed on the opening of the housing 100 in a fitting method and then may be fixed by the adhesion member.

Accordingly, the adhesion member may seal a gap between the housing 100 and the cover 200.

Referring to FIG. 4, the stator 300 may be supported by the inner circumferential surface of the housing 100.

The stator 300 may be formed of one core or a plurality of split cores coupled to each other.

Referring to FIG. 6, the stator 300 according to the embodiment may be formed by disposing a plurality of stator units 310 along a circumferential direction.

Referring to FIG. 7, the stator unit 310 may include a unit stator core 311, an insulator 312, and a coil 313.

Referring to FIG. 8, the unit stator core 311 may include a main body 311-1 and three teeth 311-2.

When the unit stator core 311 is viewed from above, the main body 311-1 may be formed to have a predetermined curvature (1/R) on the basis of a virtual center C. For example, notches 311-3 may be formed on the main body 311-1. In this case, the notches 311-3 may be may be formed on the main body 311-1 to be formed between the teeth 311-2. The main body 311-1 may be bent at the predetermined curvature by the notches 311-3.

The teeth 311-2 may be formed to protrude from the main body 311-1 to the virtual center C. Here, the three teeth 311-2 may be formed as shown in FIG. 8.

Further, a cross-section of each of the teeth 311-2 perpendicular to the center C may be formed in a T shape. Accordingly, the insulator 312 and the coil 313 coupled to the unit stator core 311 are not separated from the unit stator core 311.

The insulator 312 may be disposed between the unit stator core 311 and the coil 313.

The unit stator core 311 and the coil 313 may be insulated by the insulator 312. Here, the insulator 312 may be formed of a resin material.

Further, the insulator 312 may be provided in plural and coupled to the stator core 311. As an example, the insulators 312 may be coupled to upper and lower portions of the stator core 311.

The coil 313 configured to form a rotating magnetic field may be wound around the insulator 312.

The coil 313 may form the rotating magnetic field as a result of power supply.

As shown in FIGS. 7 and 9, the coil 313 may be individually wound around each of the teeth 311-2.

Accordingly, as shown in FIG. 10, serial connection type winding may be implemented using the coil around the unit stator core 311 on which the three teeth 311-2 are provided. Arrows shown in FIG. 10 show winding directions of the coils 313.

Meanwhile, a winding direction of the coil 313 wound around a center tooth of the three teeth 311-2 is opposite to winding directions of the coils 313 wound around teeth 311-2 disposed at both sides.

For example, the coil 313 wound around the center tooth of the three teeth 311-2 may be wound in a counterclockwise direction, and the coils 313 wound around the teeth 311-2 disposed at both sides may be wound in a clockwise direction.

As shown in FIG. 6, the stator 300 may be formed by disposing the six stator units 310 along the circumferential direction.

In this case, the unit stator cores 311 of the stator units 310 may have side surfaces attached to each other by welding. As shown in FIG. 6, side surfaces (welding points) of the main body 311-1 of the unit stator cores 311 may be welded to each other to fix the plurality of stator units 310.

Meanwhile, two stator units 310 of the six stator units 310 may implement at least one of a U phase, a V phase, and a W phase on a delta connection structure. Here, delta connection may be defined as a structure in which there is no neutral point unlike Y connection and all phase nodes are connected.

As shown in FIG. 9, every two of the six stator units 310 may implement at least one of the U phase, the V phase, and the W phase.

Further, the two stator units 310 configured to implement one phase may be disposed to face each other on the basis of a center of the stator 300. That is, the two stator units 310 configured to implement the same phase may be disposed at locations symmetrical to each other on the basis of the center of the stator 300.

Further, the two stator units 310 configured to implement one phase may be connected in parallel as shown in FIG. 10.

That is, the coils wound around the teeth 311-2 of the stator unit 310 are serially wound, and the two stator units 310 configured to show one phase may be connected in parallel.

Referring to FIG. 7, two end portions 313a of the coil 313 may be disposed on the stator core 311. Further, the end portions 313a of the coil 313 may be electrically connected to a bus bar terminal 620 of the bus bar 600.

The rotor 400 may be disposed in the stator 300, and the rotary shaft 500 may be disposed at a center portion of the rotor 400. Here, the rotor 400 may be rotatably disposed in the stator 300.

The rotor 400 may be configured by coupling a magnet to the rotor core. For example, the rotor 400 may be configured in a type in which the magnet is disposed on an outer circumferential surface of the rotor core.

Accordingly, the rotor 400 rotates due to electrical interaction between the coil 313 and the magnet, and when the rotor 400 rotates, the rotary shaft 500 rotates to generate a driving force.

Meanwhile, the rotary shaft 500 may be rotatably supported in the housing 100 by the bearing 700.

As shown in FIG. 4, the bearings 700 may be disposed at the upper portion and the lower portion of the rotary shaft 500.

The bus bar 600 may be disposed on the stator 300.

Further, the bus bar 600 may be electrically connected to the coil 313 of the stator 300.

Referring to FIG. 6, the bus bar 600 may include a bus bar body 610 and the bus bar terminal 620.

The bus bar terminal 620 may be integrally formed with the bus bar body 610 in an insertion-molding method and may have one side disposed to be exposed to the outside of the bus bar body 610. Further, the bus bar terminal 620 may be provided in plural.

Accordingly, one side of the bus bar terminal 620 may be electrically connected to the end portions 313a of the coil 313 through fusing. For example, since twelve coil end portions 313a are disposed upward from the stator units 310 at the six stator units 310, the stator 300 and the bus bar 600 may be electrically connected through fusing at twelve locations.

Meanwhile, the motor 1 may further include a sensor part 800 configured to sense rotation of the rotary shaft 500. The sensor part 800 senses a magnetic force of a sensing magnet installed to be rotatably interlocked with the rotor 400 and understands a current location of the rotor 400 to allow the rotation of the rotary shaft 500 to be sensed.

The sensor part 800 may include a plurality of magnetic elements and a printed circuit board (PCB) on which the magnetic elements are mounted. Here, the printed circuit board may be disposed on the cover 200 through thermal fusion.

Although the above-described descriptions are described with reference to the embodiments of the present invention, it should be understood that those skilled in the art may be capable of variously modifying and changing the present invention within the spirit and the scope disclosed in the claims which will be described below. Further, differences related to modifications and changes should be understood to be included in the scope of the present invention defined in the appended claims.

REFERENCE NUMERALS

1: motor, 100: first housing, 200: cover, 300: stator, 310: stator unit, 311: unit stator core, 311-1: main body, 311-2: tooth, 312: insulator, 313: coil, 400: rotor, 500: rotary shaft, 600: bus bar, 700: bearing, 800: sensor part

The invention claimed is:

1. A stator unit comprising:
a unit stator core;
an insulator disposed on the unit stator core; and
a coil wound around the insulator,
wherein the unit stator core includes a main body having a predetermined curvature based on a virtual center, wherein the main body includes:
only three teeth protruding toward the virtual center;
notches formed between the teeth,
wherein each unit stator core includes a first side surface having a triangular shape extending into the main body in a circumferential direction and a second side surface opposite to the first side surface having a triangular shape extending outwardly from the main body in the circumferential direction,
wherein each notch is formed on an inner circumferential surface of the main body, each notch is opened from the inner circumferential surface of the main body and each notch faces the virtual center, and
wherein each notch extends more than halfway between the inner circumferential surface of the main body and an outer circumferential surface of the main body.

2. The stator unit of claim 1, wherein a cross-section of the tooth which is perpendicular to the virtual center is formed in a T shape.

3. The stator unit of claim 1, wherein the coil is serially wound.

4. The stator unit of claim 1, wherein the insulator extends beyond an upper extent and a lower extent of the stator core.

5. A stator formed by a plurality of stator units disposed along a circumferential direction, each of the stator units comprising:
a unit stator core;
an insulator disposed on the unit stator core; and
a coil wound around the insulator,
wherein the unit stator core includes a main body having a predetermined curvature based on a virtual center, wherein the main body of each stator unit includes:
three teeth protruding toward the virtual center; and
notches formed between the teeth,
wherein each notch is formed on an inner circumferential surface of the respective main body, each notch is opened from the inner circumferential surface of the main body and each notch faces the virtual center,
wherein each notch extends more than halfway between the inner circumferential surface of the main body and an outer circumferential surface of the main body, and
wherein two stator units among the plurality of stator units are configured to be implemented as a same phase and are symmetrically disposed with respect to a center of the stator.

6. The stator of claim 5, wherein:
six stator units are disposed along the circumferential direction; and
the unit stator cores of the stator units have side surfaces attached to each other by welding.

7. The stator of claim 6, wherein the two stator units are one of a U phase, a V phase, and a W phase.

8. The stator of claim 6, wherein two end portions of the coil disposed on each of the stator units are disposed on the unit stator core.

9. The stator of claim 5, wherein a winding direction of the coil wound around a center tooth of the three teeth is opposite to winding directions of the coils wound around teeth disposed at both sides.

10. The stator of claim 9, wherein:
the coil wound around the center tooth of the three teeth is wound in a counterclockwise direction; and
the coils wound around the teeth disposed at both sides are wound in a clockwise direction.

11. The stator of claim 5, wherein the two stator units are connected in parallel.

12. The stator of claim 5, wherein the insulator of each stator unit extends beyond an upper extent and a lower extent of the respective stator core.

13. A motor comprising:
a rotary shaft;
a rotor having the rotary shaft disposed at a center thereof;
a stator disposed at the outside of the rotor;

a housing configured to accommodate the rotor and the stator; and a bus bar disposed on the stator, wherein the stator is formed by disposing a plurality of stator units along a circumferential direction, wherein each stator unit includes:

a unit stator core;

an insulator disposed on the unit stator core; and a coil wound around the insulator and having an end portion connected to the bus bar, wherein each unit stator core includes a main body having a predetermined curvature based on a virtual center, wherein the main body of each stator unit includes: three teeth protruding toward the virtual center; and, notches formed between the teeth, wherein each notch is formed on an inner circumferential surface of the respective main body, each notch is opened from the inner circumferential surface of the main body and each notch faces the virtual center, wherein each notch extends more than halfway between the inner circumferential surface of the main body and an outer circumferential surface of the main body, and wherein two stator units among the plurality of stator units are configured to be implemented as a same phase and are symmetrically disposed with respect to a center of the stator.

14. The motor of claim 13, wherein:

six stator units are disposed along the circumferential direction to form the stator; and the unit stator cores of the stator units have side surfaces attached to each other by welding.

15. The motor of claim 14, wherein the two stator units are one of a U phase, a V phase, and a W phase.

16. The motor of claim 15, wherein two end portions of the coil disposed on each of the stator units are disposed on the unit stator core.

17. The motor of claim 16, wherein the end portions of the coil are fused with a bus bar terminal of the bus bar.

18. The motor of claim 13, wherein a winding direction of the coil wound around a center tooth of the three teeth is opposite to winding directions of the coils wound around teeth disposed at both sides.

19. The motor of claim 13, wherein the two stator units are connected in parallel.

20. The motor of claim 13, wherein the insulator of each stator unit extends beyond an upper extent and a lower extent of the respective stator core.

* * * * *